May 16, 1967  D. SILVERMAN  3,320,541
HALL EFFECT FREQUENCY RESPONSIVE SYSTEM
Filed June 10, 1964  4 Sheets-Sheet 1
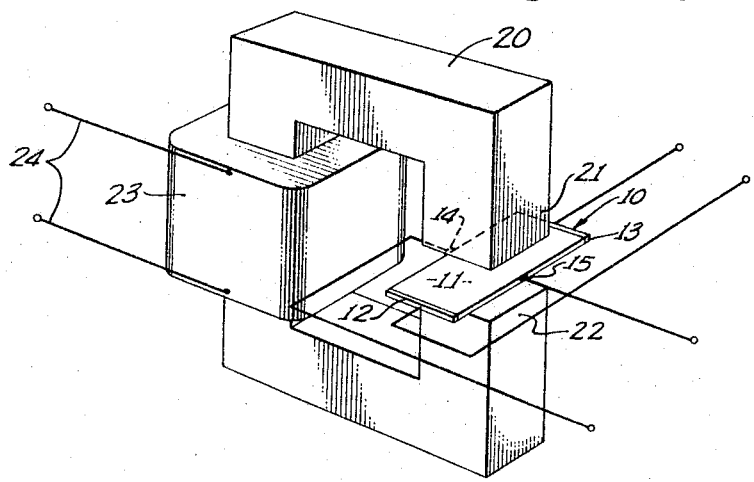
Fig. 1.
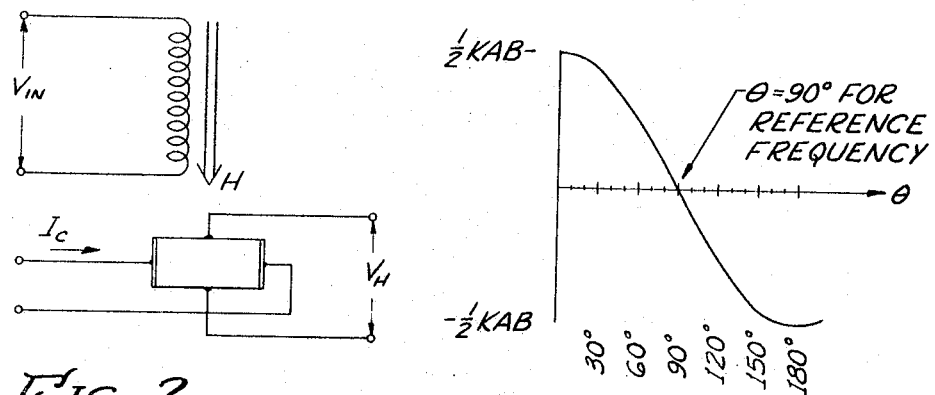
Fig. 2.
Fig. 3.
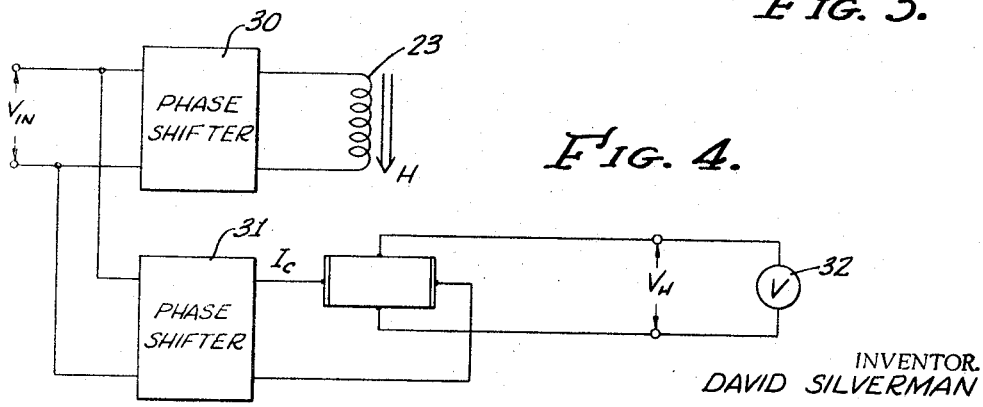
Fig. 4.
INVENTOR.
DAVID SILVERMAN
BY FOWLER, KNOBBE
& GAMBRELL
ATTORNEYS.

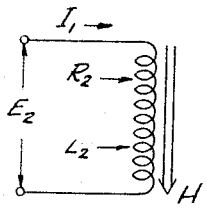
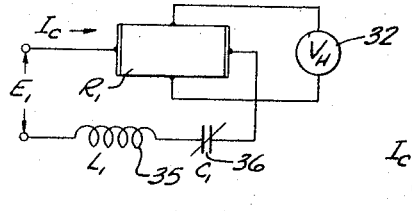
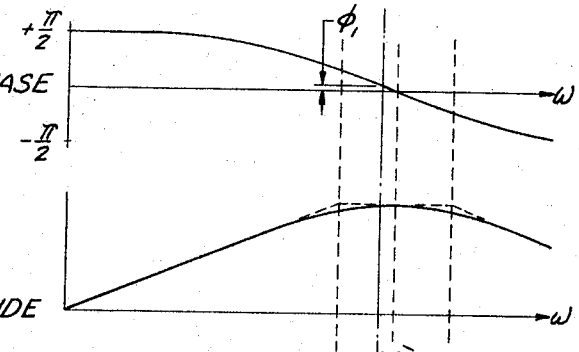
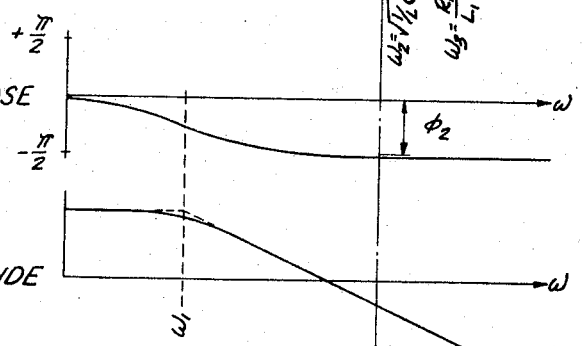
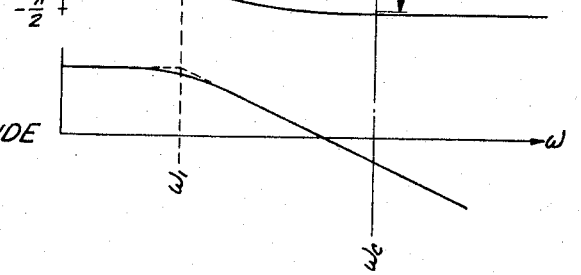
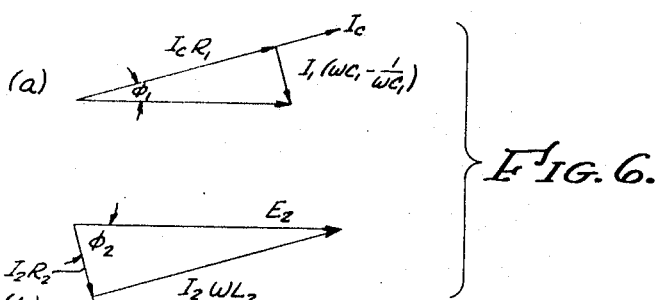
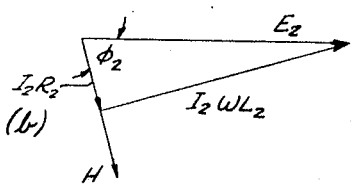

United States Patent Office 3,320,541
Patented May 16, 1967

3,320,541
HALL EFFECT FREQUENCY RESPONSIVE SYSTEM
David Silverman, Anaheim, Calif., assignor to Beckman Instruments, Inc., a corporation of California
Filed June 10, 1964, Ser. No. 374,033
7 Claims. (Cl. 329—200)

The present invention relates to an improved frequency responsive system and, more particularly, to a system utilizing the multiplying action of a Hall effect device.

The contemporary Hall element comprises a thin layer of semiconductor material, exhibiting the Hall effect, supported upon a non-conductive substrate. When a mutually orthogonal magnetic field and control current are applied to the Hall element, a Hall voltage may be measured along an axis orthogonal to the current and magnetic field axes, which voltage is equivalent to the product of the current and field. An exemplary type of Hall element is constructed from the compounds indium antimonide or indium arsenide which are evaporated upon a substrate in accordance with the teachings of U.S. Patent No. 3,082,124, entitled, "Method of Making Thin Layer Semiconductor Devices," assigned to Beckman Instruments, Inc., assignee of the present invention.

It is the purpose of the present invention to provide a frequency transducer system capable of detecting a small deviation of frequency from a preselected center frequency by utilizing a Hall effect device.

It is another object of the present invention to provide a frequency responsive system substantially independent of the temperature and voltage dependent characteristics of the individual Hall effect device.

In brief, the present invention is based uopn a particular operational mode of the Hall effect device wherein the direct current component of the Hall output voltage goes to zero when the control current and magnetic flux field are in quadrature phase relation. A very practical application of this mode of operation is made in the present invention by incorporating in combination with the input terminations of the Hall element and the magnetic field generating structure suitable phase shifting networks such that when a signal of the predetermined frequency is connected thereto, the magnetic field and control current will be 90° out of phase and thereby provide zero direct current at the output terminals of the Hall element. With the phase shifting networks so set, signals which vary only slightly from the predetermined center frequency will generate an easily detected direct current signal. Thus, an ordinary direct current meter advantageously serves as the system readout device since it inherently filters out the alternating current component of the Hall voltage and registers a null whenever the input signal is at the preset frequency value. Variation of the input frequency above or below the center frequency will cause the D.C. meter to indicate positive or negative values thereby providing a direct indication of the frequency deviation.

In a preferred embodiment of the invention described hereinafter, a pair of matched Hall elements are employed in order to provide a frequency sensitive system which is substantially independent of variations in magnitude of the input voltage and substantially less sensitive to temperature changes of the Hall element.

A more thorough understanding of the invention may be obtained by a study of the following detailed description taken in conjunction with the accompanying drawings in which:

FIG. 1 is a perspective view illustrating the primary components of a Hall effect device and its associated magnetic field producing structure;

FIG. 2 is a circuit schematic for the Hall effect system of FIG. 1;

FIG. 3 is a graph illustrating the variation in Hall output voltage for a varying phase angle between the control current and magnetic field;

FIG. 4 is a block diagram of one embodiment of the present invention;

FIG. 5 is an exemplary circuit schematic for the block diagrammatic circuit of FIG. 4;

Figure 8:
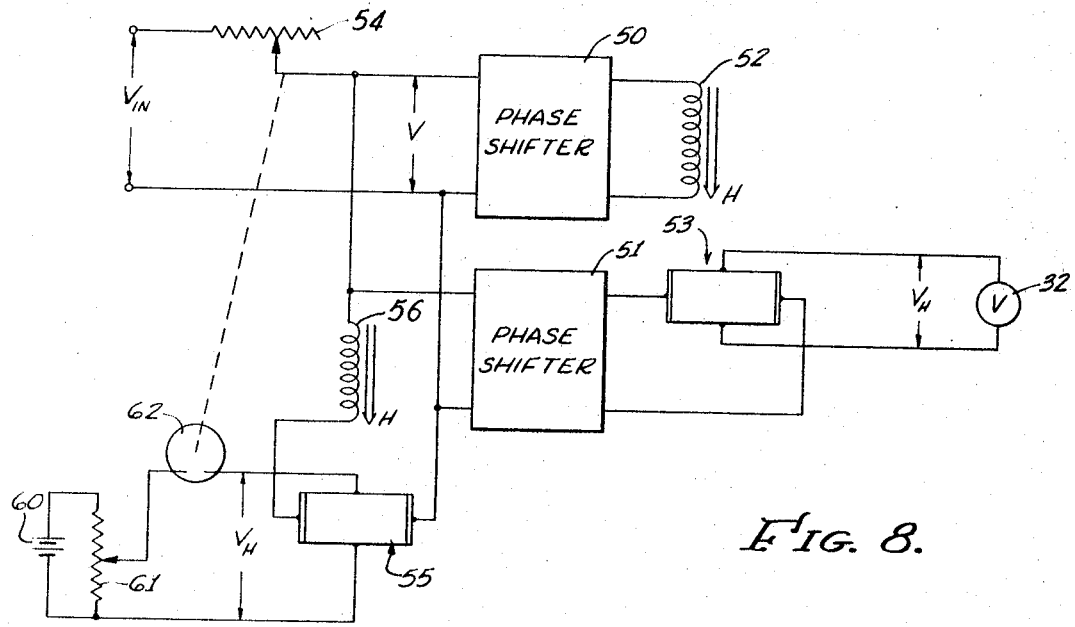
Figure 9:
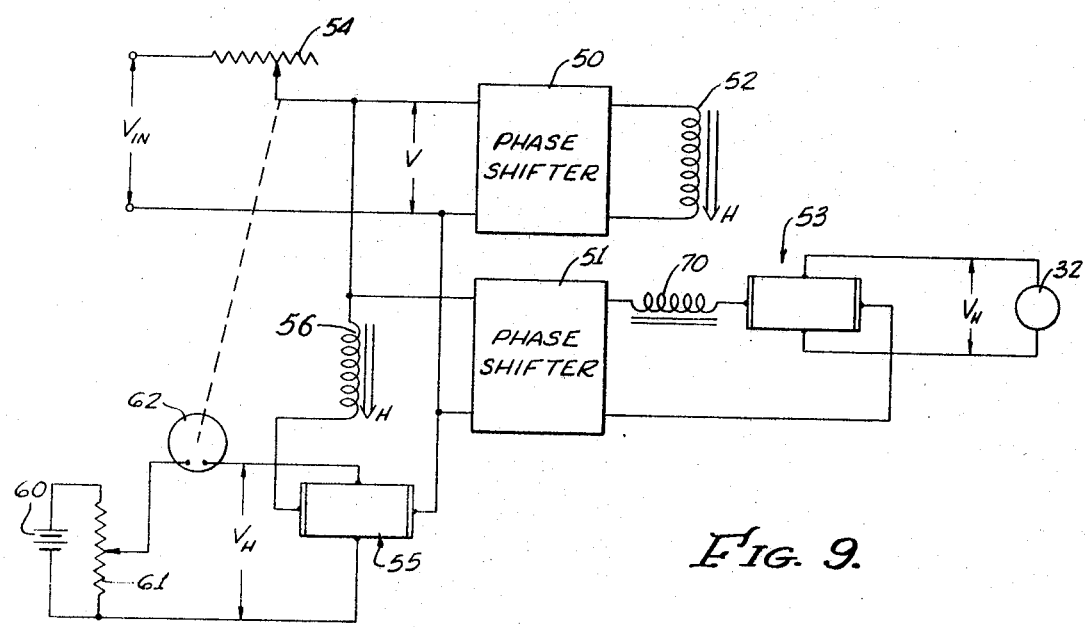
Figure 10:
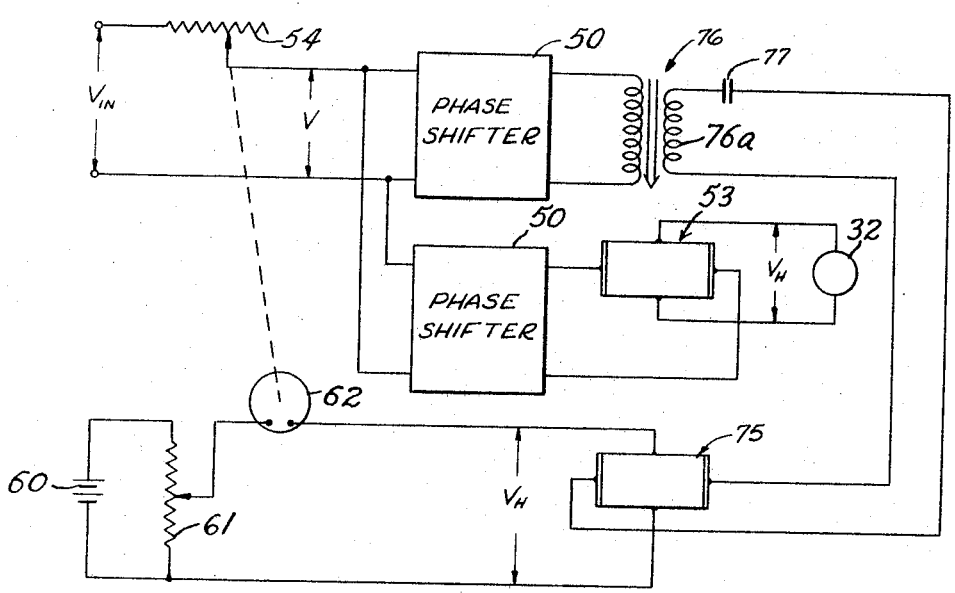
Figure 11:
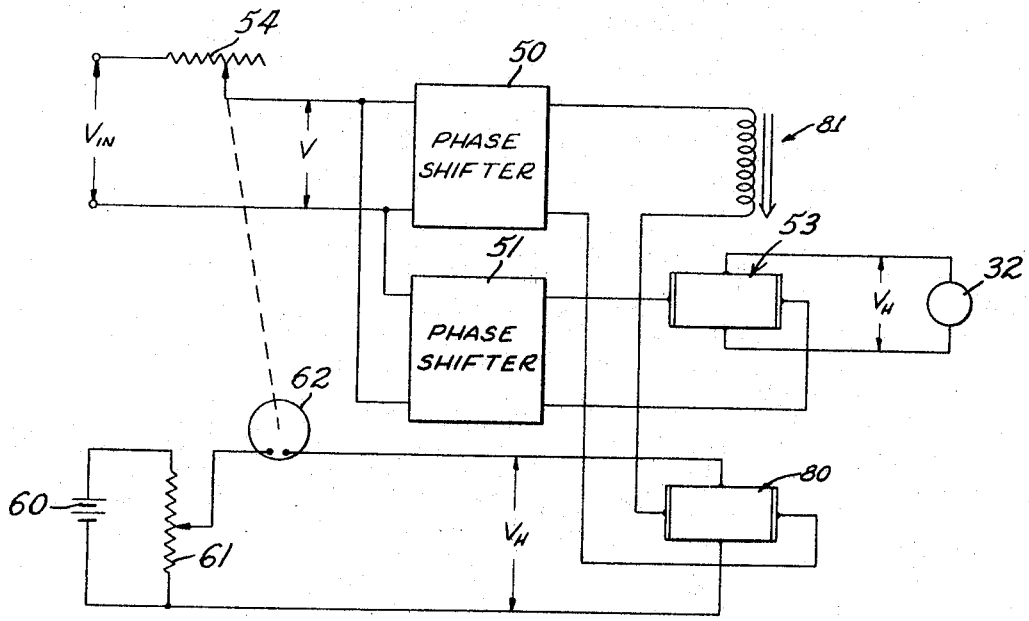

FIGS. 6a and b illustrate the control current and magnetic field vectors generated by the frequency responsive systems of FIGS. 4 and 5;

FIGS. 7a, b, c, and d are graphs illustrating the variations in both phase and magnitude of the control current and magnetic field over an extended frequency range;

FIG. 8 is a schematic, partially in block diagram, for a preferred embodiment of the present invention; and FIGS. 9, 10 and 11 are schematics each illustrating additional embodiments of the present invention.

Referring now to the embodiment of a Hall effect device shown structurally in FIG. 1 and schematically in FIG. 2, Hall element 10 comprises a thin layer of semiconductor material 11 in which the Hall effect phenomena takes place. Attached to this semiconductor layer are input control current terminations 12, 13 and Hall voltage output terminations 14, 15 defining mutually orthogonal axes. The magnetic field generating means includes an electromagnetic structure 20 including poles 21, 22 and coil 23 connected to external terminals 24. The Hall element is positioned in the air gap formed by poles 21, 22 so that the magnetic field is directed along an axis orthogonal to the input control current and output voltages axes of the Hall element.

The classic Hall voltage equation may be written $$V_H = K I_c H \qquad (1)$$

where $V_H$ = Hall voltage (2)
$K$ = Hall element sensitivity (3)
$I_c$ = Control current (4)
$H$ = Flux density (5)

For purposes of illustration, it is assumed that the alternating current signal providing the control current and flux density varies sinusoidally with time, then $$I_c = A \sin \omega_t \qquad (6)$$

and $$H = B \sin (\omega_t + \theta) \qquad (7)$$

where A and B are the maximum values of control current and flux density, respectively and $\theta$ is the phase difference between $I_c$ and H. Therefore, $V_H$ may be written as $$V_H = KAB \sin \omega_t \sin (\omega_t + \theta) \qquad (8)$$

or $$V_H = \tfrac{1}{2} KAB [\cos \theta - \cos (2\omega_t + \theta)] \qquad (9)$$

Thus, the Hall voltage output comprises both a direct current component $\tfrac{1}{2} KAB \cos \theta$ and a double frequency alternating current component $-\tfrac{1}{2} KAB \cos (2\omega_t + \theta)$. As noted above, the present invention utilizes the fact that the direct current term is zero when the angle $\theta$ is 90°, i.e. when the phase of the current into the Hall element and the flux density in the magnetic circuit are in quadrature phase relation.

In FIG. 3 is a graph showing the variation of the direct current term with change in phase angle. It is of particular interest to note that the slope of this curve is maximum when $\theta$ is equal to 90°. Hence, the output changes rapidly at this point, thereby increasing the overall sensitivity of the frequency detection system.

A simplified illustration of the present invention is shown in FIG. 4. The input voltage $V_{in}$ is supplied to the inputs of respective phase shifting networks 30, 31 which in turn respectively supply the magnetizing current to the coil of the magnetic structure and the control current $I_c$ of the Hall device. As described hereinabove, the respective phase shifts of the networks 30, 31 are selected so as to provide a 90° phase shift between the magnetic flux and the control current at the input signal frequency of interest. The direct current component of $V_H$ will then be zero at such time as the frequency of the input voltage is of such predetermined frequency. The output voltage $V_H$ is conveniently measured by an ordinary direct current D'Arsonval meter 32. Since this type of meter does not register an alternating current whose frequency is above a few c.p.s., it provides an automatic filter for the double frequency alternating current term that also exists in the Hall output voltage $V_H$. Variations of the input signal frequency above and below the center frequency will cause the D.C. meter to indicate positive or negative values thereby providing a direct indication of the frequency deviation.

The operation of the system of FIG. 4 around the desired center frequency can be approximated by the following equations. Thus, for a small change in frequency, the change in $\theta$ is also small or $$(V_H)_{DC} \approx K\Delta\theta \quad (10)$$

since $$\cos\left(\Delta\theta + \frac{\pi}{2}\right) = -\sin\Delta\theta \approx -\Delta\theta \quad (11)$$

when $\theta$ is close to 90°, i.e.

$$\theta = \frac{\pi}{2} \pm \Delta\theta \quad (12)$$

Generally, the phase angle is a function of frequency in most phase shift networks for a very small change of frequency, i.e.

$$\theta \approx K\Delta\omega \quad (13)$$

Substituting Equation 13 into Equation 10, $$(V_H)_{DC} = K_o\Delta\omega \quad (14)$$

when $$\omega = \omega_c \pm \Delta\omega \quad (15)$$

Thus, the direct current Hall voltage output is linearly proportional to the input frequency over a narrow frequency band around the desired center frequency.

An actual circuit component implementation of the block diagram schematic of FIG. 4 is shown in FIG. 5. Thus, the inductance $L_2$ and resistance $R_2$ of the Hall device magnetic structure provides the phase shifting network 30 and series connected inductance 35 ($L_1$) and variable capacitor 36 ($C_1$) provide a variable phase shifting network 31. The Hall element itself is largely resistive and is represented by $R_1$.

The voltage vectors around the respective magnetic and control current loops of the Hall device are illustrated in FIGS. 6a and 6b. In view of the discussion above, it will be apparent that the sum of the respective angles $\phi_1$ and $\phi_2$ must equal 90° at the particular frequency of interest.

FIGS. 7a, b, c and d illustrate how the phase and magnitude of the control current and magnetic flux vectors vary over the frequency spectrum. As is desired, there is a point denoted by $\omega_c$ where the phase of H and $I_c$ are 90° out of phase. For convenience of illustration, the values of phase are plotted on semi-log graph paper whereas the respective magnitude values of current and flux are plotted on log-log graph paper. As the frequency of the input voltage becomes greater or less than the center frequency $\omega_c$, the phase difference changes and the angular difference becomes either acute or obtuse. The direct current output represented by the cosine of this angle will then be positive or negative, thereby automatically indicating the direction of frequency shift.

Additional frequency points $\omega_1$, $\omega_2$, and $\omega_3$ are also shown in FIG. 7, these frequency values being defined by the following equations:

$$\omega_1 = \frac{R_2}{L_2} \quad (16)$$

$$\omega_2 = \sqrt{\frac{1}{L_1C_1}} \quad (17)$$

$$\omega_3 = \frac{R_1}{L_1} \quad (18)$$

It may be shown mathematically that these frequencies are related to $\omega_c$ in the following manner:

$$\omega_c \sqrt{\omega_2^2 - \omega_1\omega_3} \quad (19)$$

The frequency responsive systems described hereinabove have two inherent disadvantages. First, they are sensitive to environmental temperature changes since a typical Hall element has a temperature coefficient such that its input impedance changes about 700% over the temperature range of −60° C. to +125° C. Also, these systems are sensitive to changes in the magnitude of the input voltage $V_{in}$ as will be apparent by referring to Equation 9 and considering that the constants A and B are the peak values of the control current and flux density respectively. Since these values are directly proportional to the applied input voltage $V_{in}$, then $$(V_H)_{DC} = C(V_{in})^2 \cos\theta \quad (20)$$

where C is a constant. Unless these effects are compensated for in some manner, a change in the environmental temperature or a change in the input voltage will register on the readout device in a manner indistinguishable from a frequency change of the input signal. These disadvantages are substantially nullified in the preferred embodiment of the invention described hereinbelow.

Referring now to FIG. 8, the input voltage $V_{in}$ is connected to the input of respective phase shifting networks 50, 51 via a series connected variable impedance or rheostat 54. The output of phase shifting network 50 supplies the magnetizing current to the coil 52 of the magnetic structure of Hall element 53. The output of phase shifting network 51 supplies the control current to the Hall element 53. The input voltage applied the respective phase shifting networks 50, 51 is also supplied to a series circuit comprising the control current input terminals of an additional compensating Hall element 55 and coil 56 of a magnetic structure serving this Hall element 55. The D.C. component of the output voltage of the first Hall element 53 is read on D.C. meter 32 which provides the system readout. The output voltage of this second Hall element 55 is compared with a standard voltage supplied, for example, by a reference battery 60 and output potentiometer 61 in a sensing element 62, which may include an additional direct current voltmeter. In operation, the operator would readjust rheostat 54 to maintain a null setting on voltmeter of sensing element 62. Advantageously, a servo mechanism loop is provided for adjusting rheostat 54 which element 62 would also include an amplifier and servomotor, the output of which automatically drives rheostat 54 in the correct direction to maintain the output of the second Hall element 55 equivalent to the standard voltage.

In the operation of the system of FIG. 8, the magnetic flux and control current are maintained approximately in phase over the frequency band near the predetermined center frequency. The output of the second Hall element 55 is thus substantially independent of the frequency of the system input signal in this frequency band. The output of the second Hall element 55 is initially set equal to the predetermined standard voltage by adjusting rheostat 54 for a given temperature and input voltage $V_{in}$. Both Hall elements 53, 55 are mounted so as to be subjected to the same environmental temperature. It can then be properly assumed that a voltage change in the output of element 55 caused by a temperature change has caused an equivalent voltage change in the output of element 53. Similarly, if the output of Hall element 55 changes due to a change in the input voltage $V_{in}$, a similar change will have occurred in the output of Hall element 53. As a result, the output of the second Hall element 55 provides a signal indicative of an error in the system readout caused by (i) a change in magnitude of the signal applied to the system input terminals or (ii) a change in temperature of said Hall elements. Therefore, when the input impedance of rheostat 54 is modified in order to compensate for the change in the output voltage of element 55, it likewise will compensate for the error change in the output of element 53, thereby providing the desired correction for either a temperature change or a change in input voltage.

For maximum temperature compensation, the respective Hall elements 53, 55 should be matched so as to have closely similar temperature coefficients. Further, the correction will be more complete if the reactive impedance of magnetizing coil 56 is maintained substantially smaller than the resistance of Hall element 55.

It may be observed that the response of the second Hall element 55 will vary slightly with a change in frequency since the reactive impedance of magnetizing coil 56 will change with frequency, thereby changing the current through this Hall element. The effect of this frequency sensitivity is to modify the output voltage slope of the system on either side of the center frequency. If this effect is objectionable, a compensation may be provided for as shown in the embodiment of FIG. 9 wherein an additional inductive impedance 70 having the same electrical characteristics as magnetizing coil 56 is inserted in series with the control current of the output Hall element 53. Accordingly, a change in frequency will cause the same change in the control current of the first Hall element 53 as in the second Hall element 55 so as to maintain a predetermined response with frequency.

Additional embodiments of the invention are shown in FIGS. 10 and 11. In FIG. 10, the compensating Hall element 75 is excited by a secondary winding 76a of transformer 76 supplied via a phase shifting capacitor 77. In this embodiment, the flux density for both the output and compensating Hall elements is provided by a single magnetic source comprising transformer 76 with capacitor 77 providing the requisite phase shift for maintaining the control current through compensating element 75 proximately in phase with the magnetic flux vector.

In the embodiment of FIG. 11, the input control terminals of the compensating Hall element 80 are connected directly in series with the magnetic field generating structure 81. In this embodiment, a single magnetic field generating structure 81 also provides the magnetic flux for both the output and feedback Hall elements. The remaining structure and function of the embodiment of FIGS. 10 and 11 are as described above in relation to the embodiment of FIG. 8.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:

1. In a system responsive to a predetermined frequency signal applied to the system input terminals,
   first Hall effect means coupled to the system input terminals so that the magnetic flux and control current therethrough are in quadrature phase relation when a signal having said predetermined frequency is applied to the system input terminals,
   second Hall effect means coupled to the system input terminals so that the magnetic flux and control current therethrough are approximately in phase throughout the input frequency band of interest,
   means responsive to the output of said first Hall effect means for providing a system readout, and
   means responsive to the output of said second Hall effect means for providing a signal indicative of an error in said system readout caused by (i) a change in magnitude of the signal applied to said system input terminals or (ii) a change in temperature of said Hall elements.

2. In a system responsive to a predetermined frequency signal applied to the system input terminals,
   first and second Hall elements each including input terminations for passing a control current along a first axis of said element and output terminations on a second axis orthogonal to said first axis,
   first electromagnetic means including a magnetic core and an associated electrical winding for establishing a magnetic field through said first Hall element along a third axis orthogonal to said first and second axes thereof,
   second electromagnetic means including a magnetic core and an associated electrical winding for establishing a magnetic field through said second Hall element along a third axis orthogonal to said first and second axes thereof,
   means connected between said system input terminals and said means for passing a control current through said first Hall element and the magnetic winding of said first electromagnetic means for establishing a 90° phase difference between the control current and the magnetic flux through said first Hall element when said predetermined frequency signal is supplied to the system input terminals.
   means connected between said system input terminals and said means for passing a control current through said second Hall element and the magnetic winding of said second electromagnetic means for establishing a control current and a magnetic flux approximately in phase throughout the input frequency band of interest,
   means responsive to the output of said first Hall element for providing a system readout, and
   means responsive to the output of said second Hall element for providing a signal indicative of an error in said system readout caused by (i) a change in magnitude of the signal applied to said system input terminals or (ii) a change in temperature of said Hall elements.

3. The frequency responsive system defined in claim 2 including
   means for compensating for the variation of frequency of the control current through said second Hall element caused by the inductive reactance of the coil of said second electromagnetic means including an inductive reactance substantially equal in magnitude to said coil inductance connected in series with the input control current terminations of said first Hall element.

4. In a system responsive to a predetermined frequency signal applied to the system input terminals,
   first and second Hall elements each including input terminations for passing a control current along a first axis of said element and output terminations on a second axis orthogonal to said first axis,
   electromagnetic means including a magnetic core and an associated electrical winding for establishing a magnetic field through said first and second Hall elements along a third axis orthogonal to said first and second axes,
   means connected between said system input terminals and said means for passing a control current through said magnetic winding for establishing a 90° phase difference between the control current and magnetic flux through said first Hall element when said predetermined frequency signal is applied to the system input terminals, means inductively coupled to said electromagnetic means and coupled to said means for passing a control current through said second Hall element for establishing a control current through said second Hall element approximately in phase with the magnetic flux therethrough throughout the input frequency band of interest, means responsive to the output of said first Hall element for providing a system readout, and means responsive to the output of said second Hall element for providing a signal indicative of an error in said system readout caused by (i) a change in magnitude of the signal applied to said system input terminals or (ii) a change in temperature of said Hall element.

5. In a system responsive to a predetermined frequency signal applied to the system input terminals, first and second Hall elements each including input terminations for passing a control current along a first axis of said element and output terminations on a second axis orthogonal to said first axis, electromagnetic means including a magnetic core and an associated electrical winding for establishing a magnetic field through said first and second Hall elements along a third axis orthogonal to said first and second axes, means connected between said system input terminals and said means for passing a control current through said first Hall element and said magnetic winding for establishing a 90° phase difference between the control current and magnetic flux of said first Hall element when said predetermined frequency signal is applied to the system input terminals, means connecting said means for passing a control current through said second Hall element in series with said magnetic winding for establishing a control current through said second Hall element approximately in phase with the magnetic flux therethrough throughout the input frequency band of interest, means responsive to the output of said first Hall element for providing a system readout, and means responsive to the output of said second Hall element for providing a signal indicative of an error in said system readout caused by (i) a change in magnitude of the signal applied to said system input terminal or (ii) a change in temperature of said Hall elements.

6. In a system responsive to a predetermined frequency signal applied to the system input terminals, first and second Hall elements having approximately equal temperature coefficients and so located that a temperature change affecting one of said Hall elements produces a like affect on the other, means coupled to the system input terminals for establishing a control current and magnetic field through said first Hall element so that the phase angle therebetween varies with the frequency of the signal applied to the system input terminals, said phase angle being 90° when said predetermined frequency signal is applied to the system input terminals, means coupled to said system input terminals for establishing a control current and magnetic field through said second Hall element approximately in phase throughout the input frequency band of interest, means responsive to the direct current component of the Hall voltage output of said first Hall element, said value being at a null when said predetermined frequency signal is applied to the system input terminals, and means responsive to the voltage output of said second Hall element for compensating for the dependence of said Hall voltage upon a change in temperature of the Hall element or a magnitude change in the input signal, said second Hall voltage being substantially independent of the frequency of the signal applied to said system input terminals but varying in response to a temperature change or magnitude change in the system input signal in the same manner as said first Hall voltage.

7. In a system responsive to a predetermined frequency signal applied to the system input terminals, a first Hall element, means including input terminations for passing a control current along a first axis of said first Hall element and output terminations on a second axis orthogonal to said first axis, electromagnetic means including a magnetic core and an associated electrical winding for establishing a magnetic field through said first Hall element along a third axis orthogonal to said first and second axes, phase shift means connected between said input terminals of said first Hall element and said means for passing control current through said Hall element and said magnetic winding, said phase shift means establishing a 90° phase difference between the control current and the magnetic flux at said predetermined frequency, means responsive to the direct current component of the Hall voltage output of the first Hall element coupled to the output terminations of said first Hall element, a second Hall element, means for maintaining the magnetic flux and control current through said second Hall element approximately in phase, a variable impedance means connected between the system input terminals and said first and said second Hall elements, and means for comparing the Hall output voltage of said second Hall element with a predetermined standard voltage so that said variable impedance means can be varied to maintain a predetermined relationship between said voltages.

References Cited by the Examiner
UNITED STATES PATENTS

| | | | |
|---|---|---|---|
| 2,545,369 | 3/1951 | Miller | 307—88.5 |
| 3,121,788 | 2/1964 | Hilbinger | 307—88.5 |
| 3,221,273 | 11/1965 | Livingston | 329—200 X |
| 3,225,316 | 12/1965 | Saraga | 332—51 |
| 3,229,231 | 1/1966 | Saraga | 329—200 X |

ROY LAKE, *Primary Examiner.*

A. L. BRODY, *Assistant Examiner.*